United States Patent [19]
Koeninger

[11] Patent Number: 5,349,994
[45] Date of Patent: Sep. 27, 1994

[54] CONTROL SYSTEM FOR FILLING TANKS WITH LIQUIDS

[75] Inventor: Robert C. Koeninger, Fairfield, Ohio

[73] Assignee: Dover Corporation, New York, N.Y.

[21] Appl. No.: 60,709

[22] Filed: May 11, 1993

Related U.S. Application Data

[63] Continuation of Ser. No. 590,653, Sep. 28, 1990, abandoned.

[51] Int. Cl.$^5$ .............................................. B67D 5/32
[52] U.S. Cl. ........................................ 141/94; 141/95;
141/198; 137/351; 137/386; 340/621
[58] Field of Search ................ 141/198, 94, 95, 83;
340/621, 507, 635, 650, 652, 618; 73/304 C;
137/351, 386, 392, 101.25

[56] References Cited

U.S. PATENT DOCUMENTS

| | | | |
|---|---|---|---|
| 2,934,102 | 4/1960 | Martin | 141/104 |
| 3,618,643 | 11/1971 | Thomson | 141/302 |
| 3,849,772 | 11/1974 | Burnett | 340/635 |
| 3,903,430 | 9/1974 | Arns | 307/125 |
| 4,543,566 | 9/1985 | Buck et al. | 340/652 |
| 4,569,312 | 2/1986 | Riddell et al. | 122/504.2 |
| 4,598,742 | 7/1986 | Taylor | 141/83 |
| 4,649,968 | 3/1987 | Berrettini et al. | 141/95 |
| 4,668,944 | 5/1987 | Teass, Jr. | 340/603 |
| 4,679,430 | 7/1987 | Scott-Kestin et al. | 340/621 |
| 4,682,153 | 7/1987 | Boozer et al. | 340/507 |
| 4,780,705 | 10/1988 | Beane | 340/620 |
| 4,782,300 | 11/1988 | Bonaccio et al. | 340/652 X |
| 4,954,997 | 9/1990 | Dieulesaint et al. | 340/621 |
| 4,962,350 | 10/1990 | Fukuda | 323/283 |
| 4,987,408 | 1/1991 | Barron | 340/604 |
| 5,005,409 | 4/1991 | Hochstein | 73/304 C |
| 5,015,995 | 5/1991 | Holroyd | 340/621 |
| 5,051,921 | 9/1991 | Paglione | 73/304 C |
| 5,065,139 | 11/1991 | Shefsky | 340/620 |

OTHER PUBLICATIONS

Scully Intellicheck Advertisement, Scully Signal Company, 70 Industrial Way, Wilmington, Mass. Apr. 1993.
Load Anywhere-Go Anywhere Technical Manual, Scully Electronic Systems, Inc. 70 Industrial Way, Wilmington, Mass. Sep. 1983.
Tabs Advertisement, Emco/Wheaton Inc. Conneaut, Ohio Aug. 1980.
Tabs Insallation Instructions, Liquidometer/Colt Industries Tampa, Fla. Aug. 1980.

Primary Examiner—J. Casimer Jacyna
Attorney, Agent, or Firm—Kinney & Schenk

[57] ABSTRACT

A system for controlling the loading of fuel into a multicompartmented transport tank interrupts loading of fuel when the level of fuel in any compartment is above a given upper level and prevents loading when the level of fuel is above a given lower level. Fail safe operation is provided by top and bottom liquid level sensors which generate a "dry" signal to indicate that the liquid level is below the upper and lower levels in each compartment. A "dry" signal from the bottom sensor is required to initiate loading of a compartment. Once initiated, a substitute signal permits continued loading of the compartment. The "dry" signal is a pulsing electrical signal which cooperates with a multivibrator to generate a signal for each compartment indicating that loading of fuel is appropriate. Indicia lights are provided for each compartment to indicate the level of fuel in each compartment. Diagnostic means enable these lights to identify the failure of a sensor or a faulty electrical connection therewith. A dummy, "dry" signal generator permits the use of the control system circuitry with tanks having a different number of compartments.

11 Claims, 5 Drawing Sheets

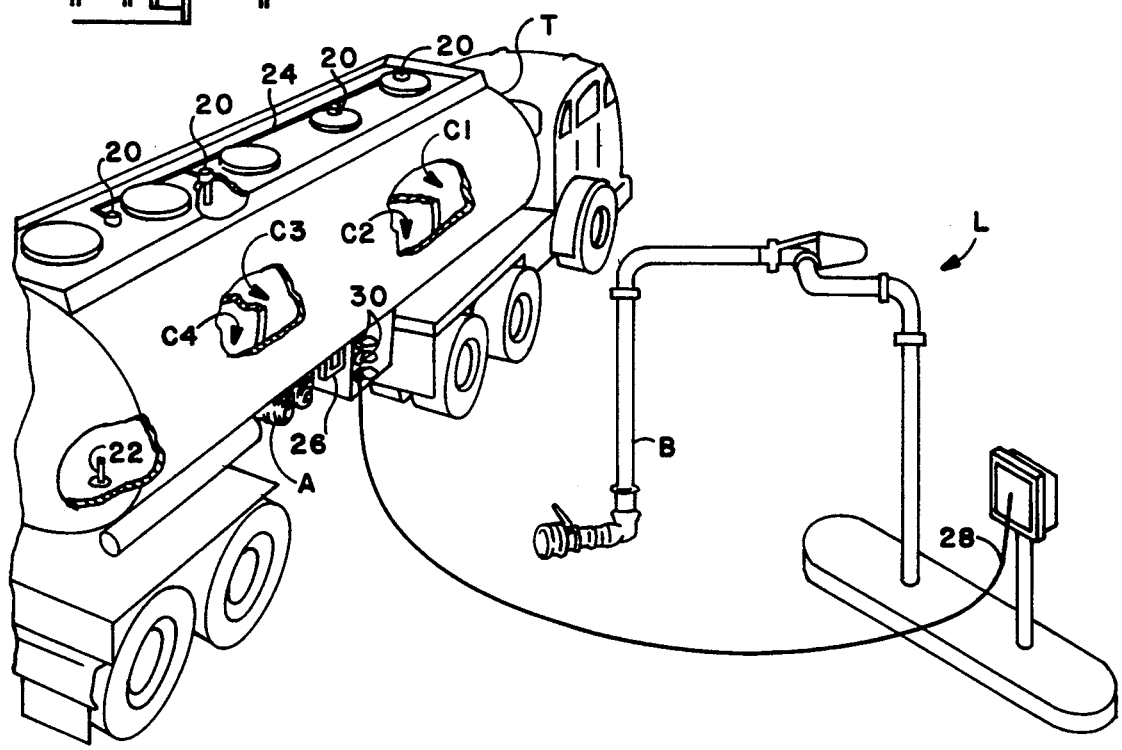
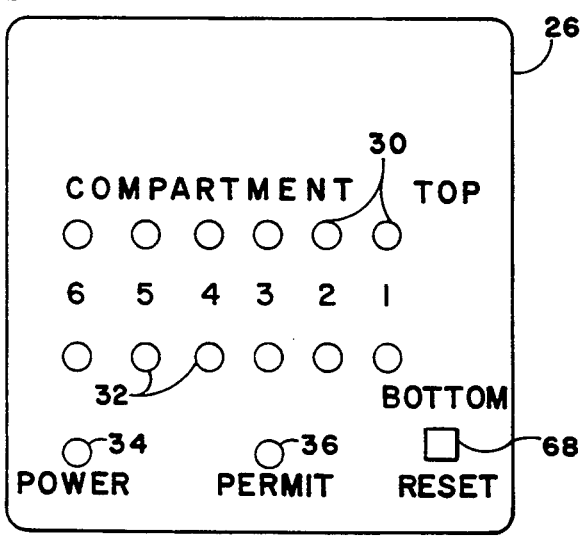

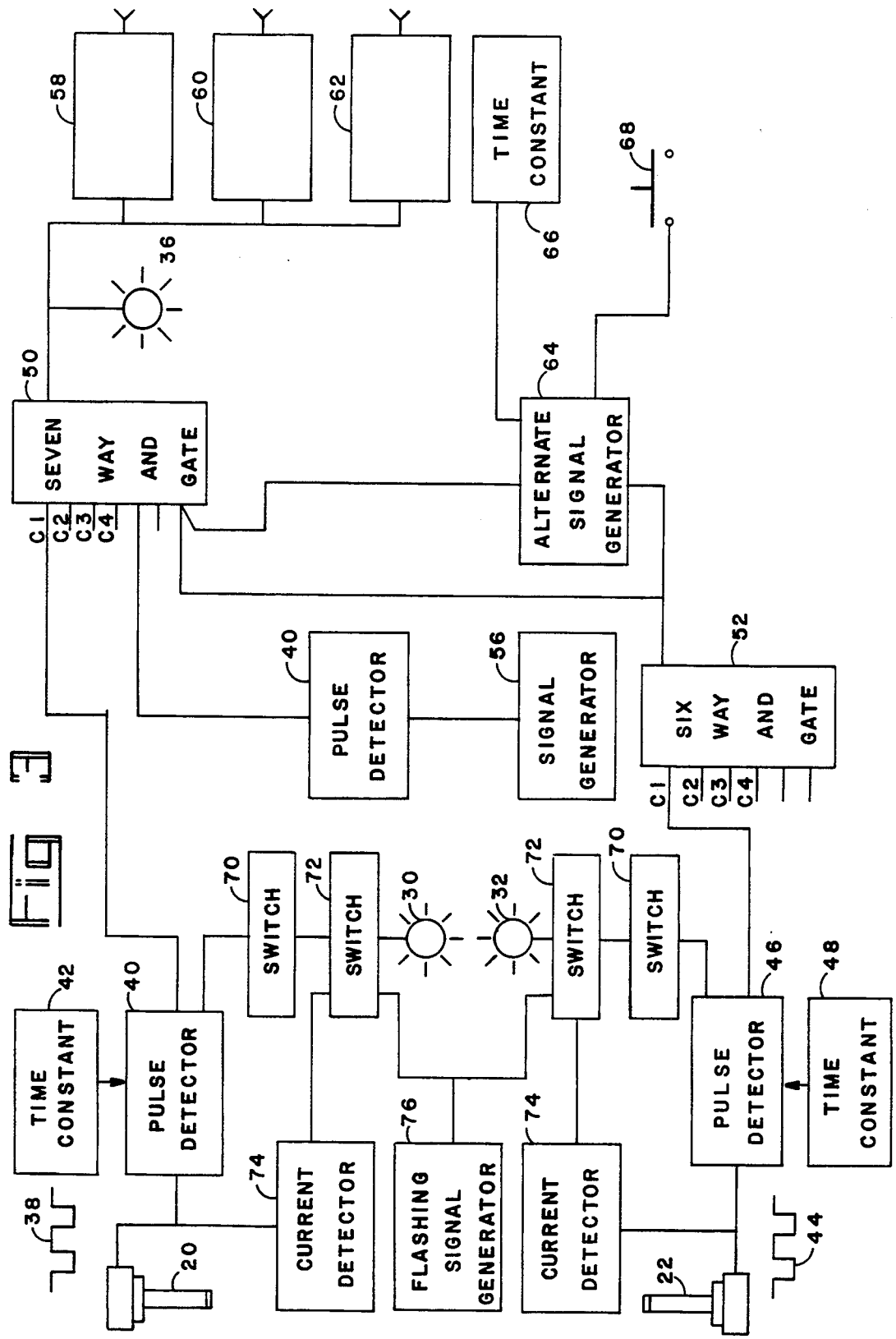

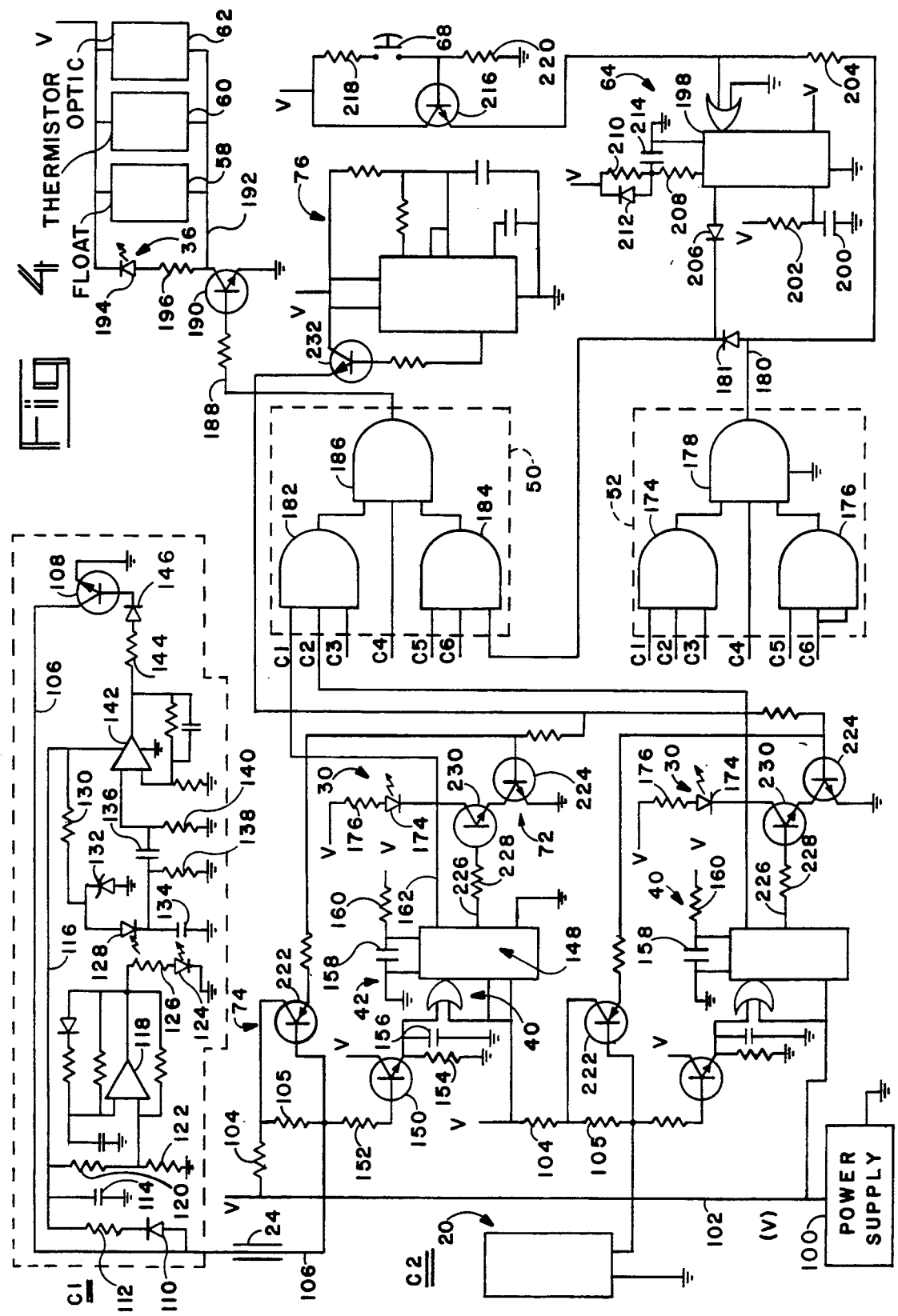

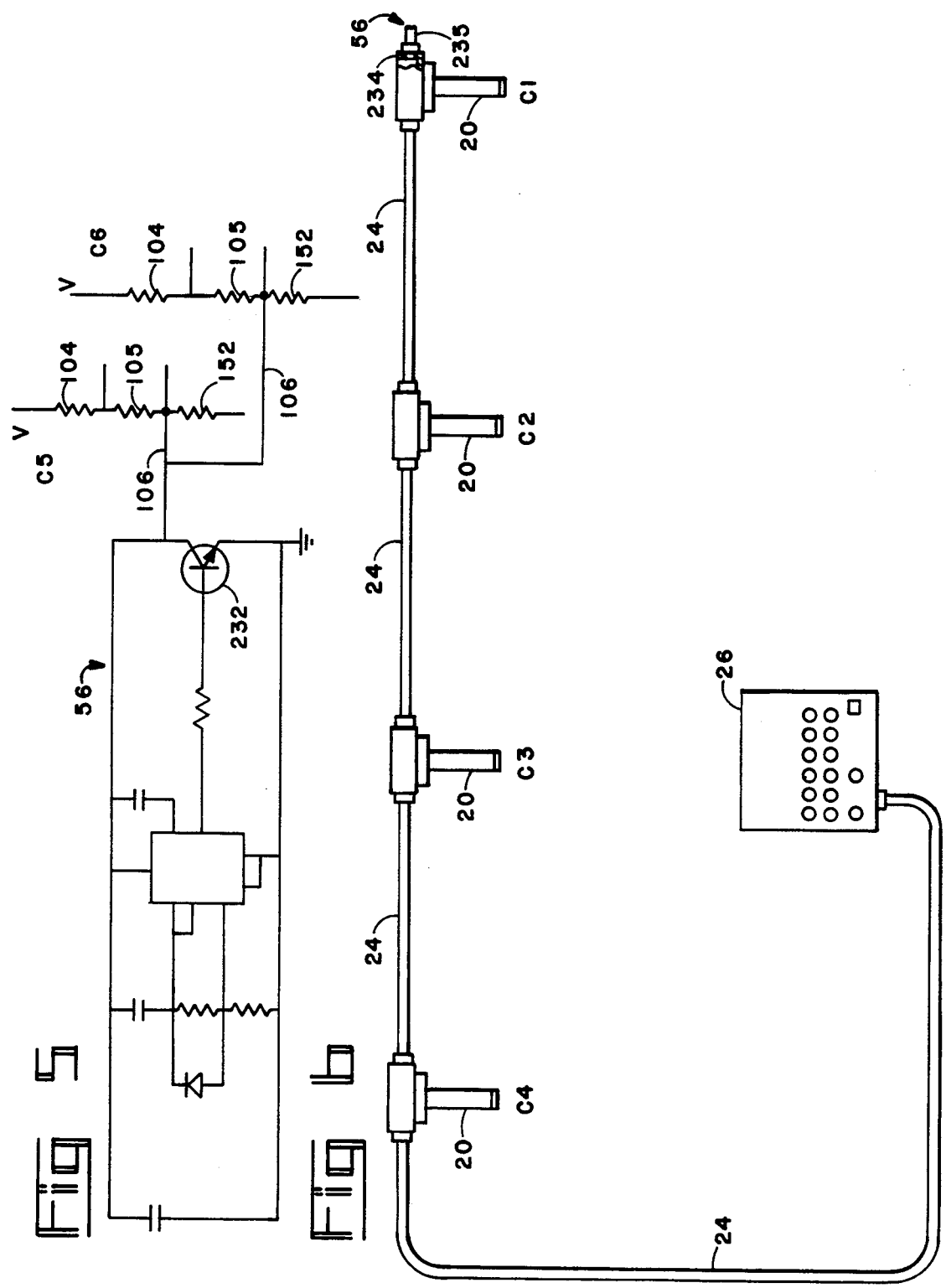

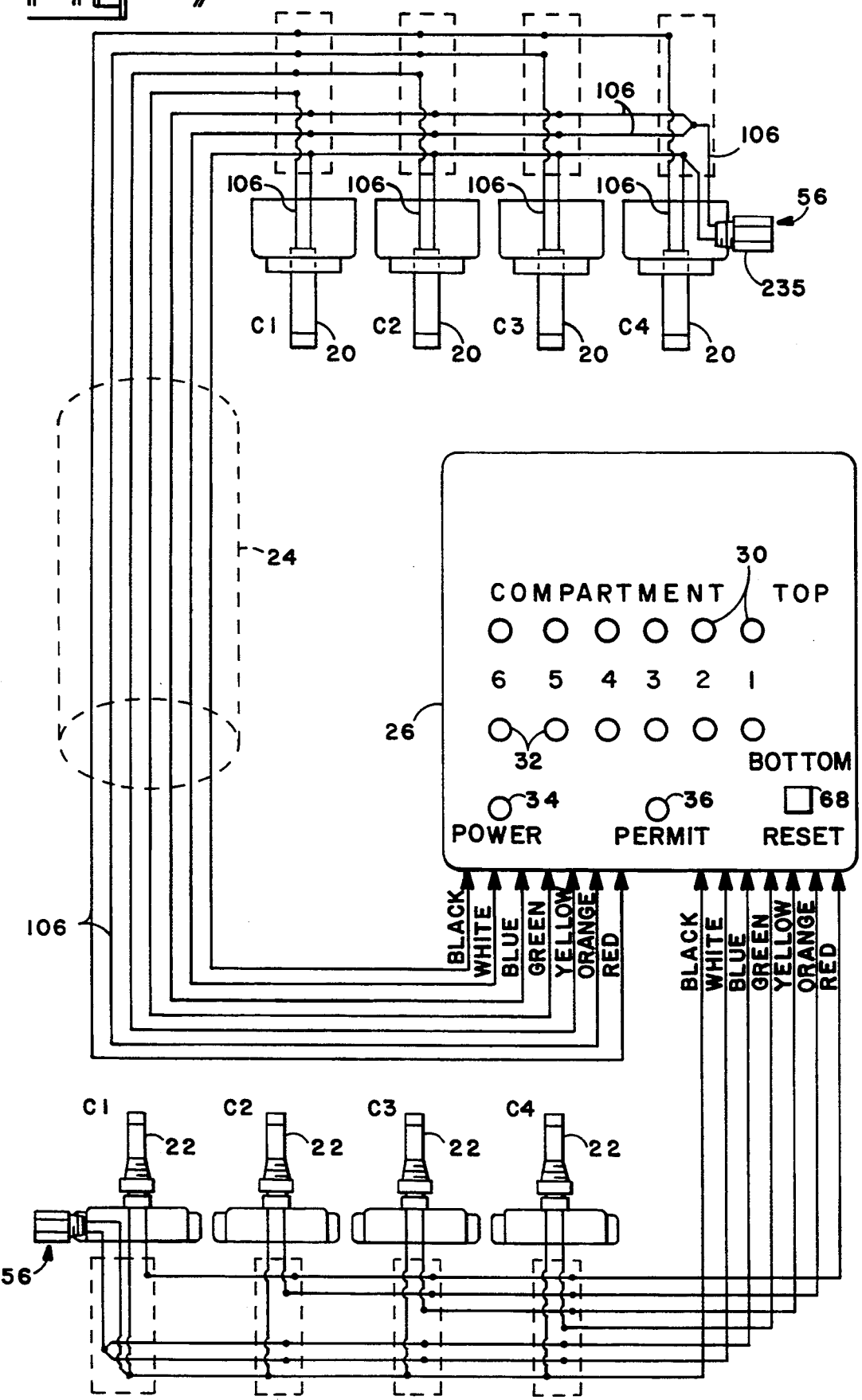

CONTROL SYSTEM FOR FILLING TANKS WITH LIQUIDS

This is a continuation of application Ser. No. 07/590,653, filed Sept. 28, 1990, now abandoned.

The present invention relates to improvements in control systems for filling tanks with liquids and, while not necessarily so limited, relates to filling tank trucks employed in the transport of petroleum products.

Loading of petroleum products into the tanks of transport trucks involves several aspects, which are not necessarily found in other tank loading operations. First, the tank is usually divided into a plurality of separate compartments. By industry standards, provision is made for loading tanks having up to six compartments, though four and five compartment tanks are most commonly employed.

In the usually course of loading a tank truck, it is driven to a loading station, or loading rack, where a hose connection is made between each of the components being loaded and a bulk storage tank. The loading rack operator then presets a metering device for the delivery of a specified amount of a particular type of product into that tank compartment. The remaining compartments of the tank are also loaded in similar fashion with the same or different types of petroleum products in predetermined amounts, as desired.

In such loading operations, the primary concern is to avoid overfilling of a tank compartment and the resulting hazard of spilled petroleum products (herein referenced as fuels for sake of brevity), as well as the environmental damage that can result from a spill.

This concern has long been recognized and many systems have been proposed and employed to prevent overfills. To attain such end various forms of sensors have been provided to detect rise of fuel to a given upper level in a tank compartment. These sensors provide an input, "shut-off" signal to control system components, at the loading rack, which interrupt the loading of fuel, when its level in a compartment exceeds a preset, upper limit. More specifically, each tank truck would be provided with control system components which would generate the "shut-off" signal. A cable connection would then be provided, to the control system components at the loading rack to attain the end of interrupting fuel flow.

Alternatively, the equivalent end could be attained by generating an enabling or "permit" signal which provided an input signal to the rack mounted, control system components. The "permit" signal is, then, a required input for the loading of fuel, as when it is terminated, by fuel reaching the level of the sensor, the loading operation is automatically interrupted.

Initially such sensors comprised a simple float actuated switch. Later, thermistors were employed which generated an electrical signal when contacted by the relatively cool fuel. Today, the preferred form of sensor is an optical sensor which provides an output when rising liquid deflects a light beam, to generate a signal, upon the fuel reaching the level of the sensor. Loading rack controls, which require electrical and thermistor type signal inputs, are still in operation.

A generally accepted type of control system involves interrupting the loading of fuel into all fuel compartments if the fuel level in one compartment exceeds the preset upper level. This, along with other motivating reasons, led to the introduction of indicia means (generally in the form of lights) for identifying in which compartment the fuel has triggered the level sensor. Also, in prior control circuits, a light has been provided to indicate that a "permit" signal is being generated and that fuel may be loaded into all compartments.

The foregoing type of control circuits are effective in preventing the overfilling of multi-compartment fuel tanks, as could arise from the loading rack operator inadvertently setting the loading meter for a volume of fuel greater than the capacity of a tank compartment.

However, if a tank is filled sufficiently to trip the overfill sensor, valuable time may be lost in checking the reason for a near overfill and making certain that everything is safe for the continued loading of a tank.

It has been recognized that another significant factor in tripping an overfill sensor sensor results from there being retained fuel in a compartment. This is to say that, should 200 gallons remain in an 800 gallon compartment, then, obviously, the overfill sensor would be triggered, should there be an attempt to load 800 gallons in that compartment.

To overcome this problem, it has previously been proposed to provide sensors for detecting if a fuel compartment has been essentially drained, so that the compartment can be filled to its rated capacity. Such sensors provide a "retain" signal if the compartment is not fully drained prior to being loaded. The "permit" signal has also been made dependent on the existence of retain signals so that a loading operation cannot be commenced unless all compartments are empty. Again, indicia lights have been provided to identify which compartment has not been fully drained.

In connection with this latter end, it will be apparent that, once the loading operation commences, the retain sensor will quickly be triggered by the presence of fuel. This resulted in the provision of means for overriding actuation of the retain sensor. In one form the means is automatic and comes into play whenever the loading operation is commenced with all compartments empty. In another form, the means is selectively actuated so that the loading operation is commenced with the operators knowledge that a given compartment is not fully empty.

In general, prior control systems, as described, have been effective in providing the desired ends of minimizing, if not eliminating overfills in the loading of multi-compartment fuel tanks.

As indicated above, optical sensors are now the preferred form of level sensor for such control systems. There remain some problems in fully realizing the recognized advantages of such sensors.

Accordingly one object of the present invention is to simplify the circuitry for optical sensors in control systems for loading fuel tanks.

Another object of the present invention is to reduce the power requirements for optical sensors and the related components for generating a "permit" signal.

Another object of the present invention is to simplify the installation of control circuit components on a tank truck.

The last identified object is related to a further problem found in the fact that loading operation workers, particularly a truck operator, generally, have little or no understanding of the principles of operation of electrical/electronic devices.

Further, the truck mounted components of these control systems, in particular, operate in harsh environments. They are subject to vibration and shock loadings, as well as dampness, all of which make the electrical components vulnerable to premature failure.

Thus considerable difficulties are encountered in the maintenance of these control systems in field operation.

Accordingly a further object of the invention is to minimize the vulnerability of the components of such systems to premature failure.

A still further object of the invention is to identify the nature of a failure, more specifically to distinguishes between a failure in a sensor and a failure in the connections thereto.

A related, further object of the invention is to attain the foregoing ends and, in a multi-compartment tank, identify in which compartment the failure originates.

While the present invention is motivated by problems involved in the loading of multi-compartment tanks for the transport of fuels and other petroleum based products, it is generally applicable to the loading of liquids in general and may find application in stationary tanks, including those having a single compartment.

The foregoing ends are provided in various fashions in a control system for the loading of liquid into a tank, wherein the system produces an enabling signal adapted and required to load liquid into the tank. Such systems have in common the provision of a sensor which includes means for generating a dry signal when the level of liquid in the tank is below the sensor, the enabling signal is generated in response to dry signal.

In accordance with one aspect of the invention the sensor has a failure mode in which generation of the dry signal terminates thereby providing a fail safe failure mode for the system.

In accordance with a related aspect of the invention a failure (either an open or short circuit) in electrical connections to the sensor results in termination of the enabling signal thereby further assuring a fail safe failure mode for the system.

Other aspects of the invention are found in generating the dry signal as a pulsed signal having a given cycle frequency. Means are then provided to detect this pulse signal to energize generation of the enabling signal. Preferably the detector takes the form of a one shot multivibrator which has a time constant permitting it to be reset by the pulsed dry signal and provide a continuious output for generation of the enabling signal. It is also preferred that the pulsed dry signal draw current no more than about 20% of the dry signal cycle.

In accordance with another aspect of the invention, top and bottom sensors are provided, both of which provided dry signals when the level of liquid in the tank is therebeneath. Dry signal is required from both for initial loading of liquid into the tank. Means are then provided for maintaining generation of the enabling signal when the bottom dry signal is termited in loading the tank. Selective means may be provided to actuate the enabling signal generating means when their is retained liquid in the tank which prevents generation of a bottom sensor, dry signal.

Another aspect of the invention is formed in providing indicia means, preferrably in the form of light. The light may have three conditions to indicate the status of the sensor. In one condition the light is not illuminated, indicating that a dry signal is being generated. In another condition the light is illuminated, indicating that a dry signal is not being generated, either because the sensor is wet or because there has been a sensor failure. In a third condition the light flashes, indicating a failure in the wiring connections to the sensor.

Other aspects of the invention reside in a control system for loading liquid into a multiple compartment tank. Each tank is provided with a sensor for generating a dry signal, as above. The enabling signal generating means require a dry signal from all of the sensors in order to be operative. Additionally top and bottom sensors can be provided for each compartment. The enabling signal generating means may then comprise a first AND logic gate requiring a high input indicating that all top sensors are dry, plus a further high input indicating that all bottom sensors are dry in order to initiate a loading operation. A substitute bottom sensor dry sensor signal may be generated in response to dry signals from all of the bottom sensors. This substitute signal is connected to the AND logic gate and maintains generation of the enabling signal when one or more of the bottom sensors becomes wet and ceases to generate a bottom signal.

Another aspect of the invention is found in a system for multiple compartment tanks having a plurality of signal detectors where the number of sensors is less than the number of signal detectors disposed in the tank compartments. The system requires dry signal inputs to each detector in order to generate the enabling signal. To obtain an enabling signal a dry signal simulator is provided and connected to the detectors for which there is no sensor to be connected.

Preferably the sensors are connected to a monitor in series fashion by cable connections. The sensors have housing with two openings the first cable connection extends between the monitor and one of the openings in the first sensor housing. Further cable connections extend from the other housing opening to the one opening in next subsequent sensor housing. The simulated signal generator is mounted in the "other" opening of the last sensor housing. A further aspect of the invention is found in the provision of a single input wire connection between each sensors and the monitor and a common ground wire between the monitor and all of the sensors.

The above and other related objects and features of the invention will be apparent from a reading of the following description of a preferred embodiment and the novelty thereof pointed out in the appended claims.

IN THE DRAWINGS

FIG. 1 is a perspective view illustrating a tank truck positioned at a loading rack, for loading of fuel with the present control system;

FIG. 2 is an elevation of a monitor unit of the control system;

FIG. 3 is a block diagram of the operational truck-mounted components of the control system;

FIG. 4 is a schematic illustration of electrical circuits employed herein;

FIG. 5 is a schematic of a dummy signal generator employed herein;

FIG. 6 is a simplified showing of cable connections between the moniter and top sensing elements of the invention; and FIG. 7 is a wiring diagram for the top and bottom sensors.

FIG. 1 illustrates a typical tractor/trailer unit employed in the transport of fuel. The trailer comprises a tank T which is separated into four compartments designated as C1, C2, C3 and C4.

At this point it will be noted that there is no theoretical limit to the number of compartments insofar as the present invention is concerned. It is an industry standard to make provision for loading tank trailers with up to six compartments and, as will later appear, such provision is found in the control system herein described. It will be further noted that tanks with less than six compartments are employed for the transport of fuel, with four and five compartment tanks being most common. Provision, as later described is made for proper operation of the present system, where a tank has less than six compartments.

In loading fuel into the tank compartments, the tractor/trailer unit is positioned adjacent to what is known as a loading rack L which comprises one or more loading booms B. Each tank compartment has an adapter A to which a boom B can be connected for the discharge of fuel into the compartment. After such connection has been made, an operator sets a meter which then controls the discharge of a predetermined amount of fuel into the tank compartment. These and other means for loading fuel into a tank compartment are well known in the art and are not shown.

Assuming that the tank compartment is empty and/or that the meter has not been set to deliver more fuel than the empty volume of the compartment, the control system of the present invention does not come into play. This is to say that after the predetermined amount of fuel has been loaded into the compartment, the boom is disconnected and the loading operation completed.

The control system, now to be described, provides means for preventing an overfill where it is attempted to load a volume of fuel into a compartment which is greater than its empty volume. It further provides means for preventing fuel from being loaded if any compartment has retained fuel, that is the compartment has not been completely unloaded before initiating a loading operation. These latter means may be selectively over ridden, for purposes later referenced.

Control systems of the type referenced have been in use for many years and take different forms, some of which provide only for the prevention of an overfill, without providing any functions relative to retained fuel.

To attain these ends, a top, overfill sensor 20 is mounted adjacent to the upper end of each of the compartments C. Additionally, a bottom, retain sensor 22 is mounted adjacent the bottom of each compartment C. Wiring cables 24 connect the top sensors 20 to a monitor 26, which is mounted on the trailer, adjacent the adapters A. The bottom sensors 22 are likewise connected to the monitor 26 by wiring cables which are hidden from view in FIG. 1.

The sensors provide signal inputs to circuitry within the monitor. The function of this circuitry is to generate an output signal, referenced as a permit signal, when all of the compartments are empty, i.e. the level of any retained fuel is beneath the bottom sensors 22. This circuitry also deenergizes the permit signal when the level of fuel, in any compartment, reaches a top sensor 20.

This permit signal is transmitted by a cable 28 to rack mounted components of the control system. The rack mounted components are responsive to and require the permit signal in order to deliver fuel. In other words, loading of fuel can only be commenced when a permit signal is sensed by the rack mounted components and will be automatically terminated when that signal is interrupted. There are, currently, three forms of permit signal to which the rack mounted components are responsive. The circuitry within the monitor 26 generates these three forms of signals. The cable 28 may be selectively connected to the appropriate receptacle 30 to which the three signal forms are, respectively fed, dependent on the design of the rack mounted components.

In addition to controlling the loading of fuel in the manner described, indicia means are provided on the monitor 26 for indicating in which compartment a top sensor has been actuated, or in which compartment retained fuel has been detected. To this end, a series of lights 30 are mounted on the monitor to indicate the status of the top sensors of each compartment. Similarly, a series of lights 32 is provided to indicate the status of the bottom sensors. When a top sensor 20 is actuated, the corresponding light, for the compartment where that sensor is located, is illuminated. If there is retained fuel which has actuated a bottom sensor 22, the corresponding light, for the compartment is located, is illuminated.

Also provided on the monitor 26 is a light 34, which indicates that the truck mounted components of the control circuit are energized. A further indicia light 36 is mounted on the monitor and provides an indicia that a permit signal is being generated.

The foregoing description of system components, generally, describes the structure and functions of control systems as they have been used prior to the present invention. These components are modified to attain the ends of the present invention as is further developed below.

Reference is next made to FIG. 3 for a description of the functional operation of the improvements provided for such control systems by the present invention.

The sensor 20 is of a known type based on the use of a light emitting diode and a light responsive diode. In the sensor's dry condition, light is reflected by a prism to energize the light responsive diode and generate a signal which indicates that the fuel level has not reached the sensor. When the prism is wetted, the light beam is deflected so that the light responsive diode is no longer energized. The lack of a signal output from the sensor 20, then indicates that fuel has reached the level of the sensor, and that an overfill condition is imminent.

The sensor of the present invention is characterized by providing an output signal, indicating a dry condition, which is pulsating. Preferably the output signal, indicated by plot 38, has an 80% duty cycle. That is, period the of its negative going portion, during which current is drawn by the circuit, is approximately 20% of the time of a cycle. The output signal has a fixed, given frequency. The frequency of this output signal is not critical. A relatively low, cycle frequency of 166 Hertz has been found satisfactory.

The sensor signal is fed to a pulse detector 40 which generates a sensor dry, output signal, which may be a steady state signal, so long as there is a pulsating input thereto having the said given frequency.

In a preferred sense, the pulse detector takes the form of a one shot multivibrator which is triggered by a positive going input. A time constant input 42 maintains the conductive state for a period greater than the cycle time of the pulsating signal. Thus, so long as the output signal, of sensor 20, has at least said given frequency, the one shot multivibrator will be reset to maintain a sensor dry, output signal.

The bottom sensor 22 may be identical in construction and function with the top sensor 20, excepting only that it is physically disposed at the bottom of the tank compartment in which the top sensor 20 is mounted.

The bottom sensor 22 thus generates a pulsating signal output 44 so long as the level of any fuel in the compartment is below the level of the sensor, this indicating that there is no retained fuel in that compartment.

The signal 44 is fed to a second pulse detector 46, which, again may be identical with the pulse detector 40 and comprise a one shot multivibrator, having the a time constant input 48 which permits a dry signal output so long as the sensor signal 44 is at or higher than said given frequency.

The foregoing description is applicable to the top and bottom sensors for each of the compartments C1, C2, C3 and C4. Thus, sensor dry signals, for the top and bottom sensors, are generated for each of these compartments. For illustrative purposes, the described sensors and pulse detectors are designated as those for compartment C1.

The sensor dry signal for sensor 20, thus becomes a C1 input to a seven way AND gate 50. The sensors 20 in the remaining compartments provide C2, C3 and C4 inputs to the gate 50. The function of the AND gate 50 is to provide an output signal when there are seven signal inputs thereto.

The sensor dry signal for sensor 22, likewise becomes a C1 input to a six way AND gate 52. The sensors 22, in the remaining compartments, respectively provide C2, C3 and C4 inputs to the gate 52. The function of the AND gate 52 is to provide an output signal when there are six signal inputs thereto.

At this point there will be a digression to note that the illustrated circuit is adapted for use with tanks having up to six compartments. The six and seven way AND gates are required to provided this capability. However, where, as here, there are less than six compartments, it becomes necessary to simulate a "dry" condition for the non-existent compartments.

Consistent with the capability of use with a six compartment tank, the present circuit comprises six top pulse detectors 40 and six bottom pulse detectors 46. Each of the unused pulse detectors (in the present case two top and two bottom) is connected to a signal generator 56, which provides a pulse input having the characteristics of the signals 38 and 44. This is illustrated in FIG. 3 by a single, unused pulse detector 40. This pulse detector provides a fifth dry signal input to the AND gate 50. The other unused pulse detector would be provided with the same "dummy" signal input and thereby provide a sixth dry signal input to the AND gate 50.

The unused pulse detectors 46 are likewise provided with "dummy" signal inputs and provide two continuous, dry signal inputs to the six way AND gate 52.

Thus, if the compartments C1, C2, C3 and C4 are empty, when the system is energized, there will be six dry signal, high inputs to AND gate 52. In turn, the gate 52 will provide a high signal output which is connected to and becomes the seventh high input to the AND gate 50. High signal inputs are provided from the four active pulse detectors 40 and two high inputs are provided by the "dummy" signal generators. Thus, with seven high inputs, the gate 50 generates an output, permit signal. The output permit signal then energizes enabling signal means for initiating a loading operation, as above described. These enabling signal means comprise a "float signal" generator 58, a "thermistor signal" generator 60 and an "optics signal" generator 62. The cable 28 is selectively connected to the output signal generator (58, 60 or 62) which provides a signal with which the rack mounted components of the control system is compatible.

It will also be seen that the output of the gate 50 is connected to the light 36. Thus when a permit signal is being generated the light 36 will be illuminated to provide an indicia that the truck mounted components of the control system are functioning properly and that all of the compartments are empty.

It will be apparent that, shortly after loading of fuel is commenced, one or more of the sensors 22 will be wetted and generation of the pulsing output signal 44 terminated. This, in turn, terminates the dry signal output of the affected pulse detector 46, causing at least one of the inputs to the AND gate 52 to switch to a low. When this occurs, the output of the gate 50 is terminated and there is, thus a low input to the seven way AND gate 50. This, in turn results in a termination of the permit signal and an interruption in the loading of fuel.

In order to permit loading of fuel, it becomes necessary to provide an alternate high signal input to the gate 50. This end is provided by an alternate signal generator 64. The signal output of the gate 52 is, additionally, connected to the signal generator 64. Advantageously, the signal generator 64 may also be a one shot multivibrator, provided with a time constant input 66. The time constant input provides an output signal cycle of approximately 30–35 minutes, when the multivibrator 64 is triggered by an input signal from the AND gate 52. The signal output from the generator 64 thus provides a seventh high input to the AND gate 50 for this period of time.

A normal loading operation will be completed in this 30–35 minute time period. If during loading, the volume of fuel in any one of the compartments exceeds a safe level, as determined by the position of the upper sensors 20, the pulsating signal from the sensor 20 in that compartment will be terminated. The dry signal into the AND gate 50 will change to a low and the permit signal output therefrom will be terminated, thereby causing an interruption in the loading of fuel and preventing an overfill to occur.

It is to be recognized that there are occasions where it is desired to load fuel into a compartment which is not empty. For example, gasohol can be provided by first loading a compartment with alcohol and then adding gasoline. This can involve a first loading operation at one loading rack and a second loading operation at another loading rack. Since a dry signal input will not be generated at the second rack, means are provided to selectively actuate the alternate signal generator 64 and thereby provide a seventh high input to the gate 50, so that a permit signal will be provided under such condition. To this end, a manually operated switch 68 is provided. This switch is physically mounted on the monitor 26, where it may be conveniently actuated by an operator.

In addition to providing the control functions just described, the present invention provides indicia means which identify in which compartment on overfill condition exists (i.e., the fuel level has exceeded the upper limit which is established by the sensor 20 therein. Further, means are provided for identifying which compartment, or compartments, are not empty when initiation of a loading operation is defeated by failure to generate a permit signal.

Additionally, these indicia means provide for selective identification of defective sensors and defective electrical connections thereto. This feature is of great significance in facilitating repair and maintenance of the control system. It is of particular significance in enabling persons with limited experience in trouble shooting electrical/electronic devices to identify which portions of the system are defective. Thus, if a single, defective sensor is identified, it may be readily replaced and the system restored to an operative condition in a minimum of time. Similarly, in identifying that the defect exists in the wiring connections to a particular sensor, checking and correction of faulty connections, or shorts, can be accomplished with a minimum of time and effort.

These means are provided by the lights 30 associated with the top sensors 20 and the lights 32 associated with the bottom sensors 22, and the functional blocks now to be described.

When the pulse signal 38 is terminated, the signal detector 40 provides an input signal to a switch 70. The switch 70 is connected in series with a normally closed switch 72, so that the light 30 identifying compartment C1 will be illuminated to indicate that wetting of the top sensor in compartment C1 has been the cause for loss of the permit signal.

Diagnostic functions are provided in the following fashion. It was previously indicated that switch 72 is normally closed. This end is attained by a current detector 74 which is responsive to quiescent current flow through the sensor. This is to say that there is a small amount of current flow through the sensor even when the sensor is wetted and a pulsing signal is not being generated. When the current detector 74 senses this current it provides an input which closes the switch 72.

Thus, when the sensor 20 is wetted, terminating the pulse signal 38, the output for pulse detector 40 closes switch 70 and, with switch 72 closed, illuminates the light 30.

The same result is obtained if there is a failure in the sensor 20, which results in a failure to generate a pulse signal when the sensor is dry. Normally this type of failure occurs under conditions wherein the referenced quiescent current flow is maintained. The switch 72 is maintained in its normally closed position. In the absence of a pulse signal, the pulse detector 40 will provide an input to close the switch 70 and illuminate the light 30.

This diagnostic function is of primary utility when a tank trailer is brought to a loading rack for loading, and its compartments are known to be empty. If there is a failure to obtain a permit signal, the illuminated lamp 30 will indicate, as the most likely cause, a failed top sensor in the compartment C1, or whichever compartment the illuminated lamp 30 is associated with.

The current detector also provides means for identifying a short or open circuit in the electrical connections between the monitor and a sensor. When either of these conditions occurs, the signal input, from the current detector 74, which has maintained the switch 72 in a closed condition, is terminated. However, a second input is provided to the switch 72 from a pulsing signal generator 76. The pulsing signal thus provided to the switch 72 causes it to oscillate between an open and closed condition.

When there is an open or short in the electrical connections between the monitor and the sensor, there is also a loss of the pulse signal 38 and, therefore a closing signal input to the switch 70, as well as loss of a dry signal input to the AND gate 50 and a loss of the permit signal. The switch 72 opens and closes so that the light 30 will flash in a fashion which indicates that failure to obtain a permit signal is caused by a problem in the wiring connections to the top sensor for compartment C1, or whatever compartment the flashing light is associated with.

Identical circuitry may be employed to provide the indicia lamps 32 with the same functions to identify a wet condition, a failed sensor condition or a wiring problem. The functional blocks for such circuitry are identified in FIG. 3, but are not deemed to require specific description.

It will be noted that there is a bit more involved in the identification of a failed bottom sensor 22, in that there is a lesser expectation that they will be dry when the control circuit is first energized. However, if a lamp 32 is illuminated and, after checking, it is found that the compartment with which is associated is dry, then identification of a failed sensor is confirmed.

It will also be noted that a common flashing signal generator can be employed as an input for the several switches 72 employed in the control system.

Reference is next made to FIG. 4 for a description of a preferred circuit for attaining the foregoing functions.

As a preliminary, it will be noted that this circuit is energized by a power supply 100, which, in turn, may be powered by the 12 volt battery which is provided for operation of the electrical components of the tractor to which the tank is connected. The power supply 100 would preferably have current limiting and voltage limiting means which render it safe operation in a hazardous environment, such as exists in the loading of fuel. Such power supplies are well known, and, for present purposes, it is necessary only to appreciate that a positive output potential is provided at its output, at conductor 102. This output voltage, is indicated by reference character V and has a potential of approximately 11 volts. Voltage V is supplied directly as an input to several of the components of the circuit. For sake of simplification, reference character V is indicated at such inputs, rather than illustrating conductors extending back to the power supply 100. The ground connections for this circuit are preferably provided by separate conductors, but, in FIG. 4 are simply shown diagrammatically.

The pulse generating components of one of the sensors 20 will first be described. Power input to the sensor is derived from voltage V, through resistors 104, 105 to provide a potential of approximately 10 volts on conductor 106, these components being physically mounted in the monitor 26. The conductor 106 extends through cable 24 to the sensor 20.

The conductor 106 is periodically connected to ground through a transistor 108, which functions as a switch. Actuation of the transistor 108, between conductive and non-conductive states is controlled in the following manner.

A regulated voltage supply is derived from the conductor 106 through diode 110, resistor 112 and capacitor 114 providing a potential of approximately 10 volts on conductor 116. This voltage is the power source for an oscillator 118 the input for which is derived intermediate a voltage divider comprising resistors 120, 122. The oscillator 118 has appropriate feedbacks to provide a square wave output, preferably with a duration of approximately 1 millisecond with a five millisecond period between the square wave pulses. The output of the amplifier 118 is connected to a light emitting diode 124, through a resistor 126.

A pulsing beam of light is thus generated. This beam of light is deflected by a prism (not shown) against a light responsive diode 128 which is connected through a resistor 130 to the filtered voltage potential on conductor 116, with zener diode 132 providing further voltage regulation. The light responsive diode 128 is connected to ground through a capacitor 134. An output signal is thus generated across the RC network comprising capacitor 136 and resistors 138, 140. A signal input, having the same characteristics as the signal generated by the oscillator 118, is thus provided as the input to an operational amplifier 142. The operational amplifier is energized by being connected across the conductor 116 to ground.

The beam of light, from light emitting diode 124 is properly deflected to provide a signal input to the operational amplifier 142 only when the prism sensor is dry. When fuel level rises to a point where the prism is wet, generation of an input signal to the operational amplifier 142 is interrupted. This is a known manner of detecting whether a sensor is wet or dry. While the invention is particularly adapted to this type of detection mechanism, the mechanism, per se, does not form a part of the present inventive concepts.

The operational amplifier 142 has appropriate feed backs for generating positive going pulses having the same wave form as produced by the oscillator 118. The output of the operational amplifier is fed to the base of transistor 108 through a resistor 144 and diode 146 and has a strength sufficient to bias the transistor to a conductive state for the duration of each positive spike.

Reference is next made to the pulse detector 40 which, in FIG. 4, is illustrated as comprising ½ of a standard, 14538 one shot multivibrator 148. The conductor 106 provides a signal input to the multivibrator 148 through a buffering circuit which includes a transistor 150. The base of transistor 150 is connected to the conductor 106 through a resistor 152. The collector of transistor 150 is connected to the power source V and its emitter is connected to ground through a buffering RC circuit comprising a resistor 154 and capacitor 156. The emitter of transistor is connected to the positive going input pin of the multivibrator 148.

With this arrangement, when the transistor 108 (in the sensor 20) is conductive, line 106 is connected to ground, this renders the transistor 150 non-conductive. When conductor 106 is subsequently disconnected from the ground connection, the transistor 150 becomes positive and provides a triggering input to the multivibrater 148. The duration of the output of the multivibrator cycle is determined by the time constant 42 which comprises capacitor 158, and resistor 160 which are connected between the voltage source V and ground, and provided with conventional input connections to the multivibrator 148.

Thus, each time the conductor 106 is connected to ground, there is a triggering input to the multivibrator 148. This initiates a positive signal on a conductor 162, which, in turn provides a high input to the seven way AND gate 50. The capacitor 158 and resistor 160 provide a cycle duration for the multivibrator which is at least as great as the cycle time of the output signal of the sensor 20, as represented by the pulses of current which flow through conductor 106 as a result of its being connected to ground, through the transistor 108. Thus, so long as the sensor 20 is dry, the multivibrator 148 will be reset to provide a continuous, dry sensor signal output on the conductor 162 and a high input to the AND gate 50.

The foregoing describes preferred circuit elements for providing a pulse detecting function which provides a dry sensor signal output. This pulse detecting function is required for each of the sensors 20 and 22. This end is attained by replicating the described circuit elements to provide the capability of detecting top and bottom dry sensor signals for as many as six tank compartments.

FIG. 4 illustrates the pulse detector 40 for the compartment C2. The components for this detector are identified by like reference characters and function in an identical fashion with the pulse detector components just described to provide a dry signal, high input, for the C2 compartment to the seven way AND gate 50.

Economies are found in the use of the 14538 one shot multivibrator 148 in that its other half provides the detecting function for a second sensor. Provision for detecting signals from six top sensors, can thus be had from three circuit components.

As indicated, the pulse detector circuits for the bottom sensors 22 are identical with the circuit for detecting a pulse from the top sensor 20 in compartment C1, which has been described in detail, as well as the pulse detector circuit for the top sensor 20 in compartment C2, which has been illustrated. A further detailed description of these replicated components is therefore not required. It is sufficient for an understanding of the present invention to appreciate that, when any of the bottom sensors 22 is not wetted, a dry signal output from the pulse detector (specifically the one shot multivibrator thereof) for that sensor, becomes a high input to the six way AND gate 52.

Economies are attained in using three, standard AND gates 174, 176 and 178. The dry signal output for the bottom sensors 22 in compartments C1, C2 and C3 are inputted into the AND gate 174 to produce a high signal which becomes a high input for the AND gate 178. A dry signal output from the bottom sensor in compartment C4 becomes the second high input to the AND gate 178. The dry signals from the bottom sensors in compartments C5 and C6 provide high signal inputs for the AND gate 176. The signal from compartment C6 is fed to two inputs of the AND gate 176. With three high signal inputs to the AND gate 176, a high output therefrom becomes the third high input to the AND gate 178 and results in a high, positive, signal on conductor 180.

The high signal generated on conductor 180 is fed through diode 181 to the AND gate 50. The dry signal inputs from the pulse detectors for the top sensors 20 provide six inputs to the AND gate 50 and the signal from the AND gate 52 is the seventh input thereto.

The AND gate 50 similarly employs three standard three way AND gates 182, 184 and 186. The AND gate 182 is connected to the output from the detectors in compartments C1, C2 and C3 to provide one input to the AND gate 186. The signal from compartment C4 is the second input to the AND gate 186. The signals from compartments C5 and C6 and the bottom sensor signal from AND gate 52 provide inputs to the AND gate 184, which in turn provides the third input to the AND gate 186.

When the level of fuel in all of the compartments is beneath the level of the respective bottom sensors 22, dry signal outputs will be provided by all of the several pulse detectors. All of the inputs to the AND gate 52 will be high and, likewise, all of the inputs to the AND gate 50 will be high. The output from AND gate 186 will be turned to a high, positive signal, which is referenced as a permit signal, on conductor 188.

This permit signal is connected to the base of a transistor 190 and biases it to a conductive state. The "float signal" generator 58, the "thermistor signal" generator 60 and "optics signal" generator 62 connected in parallel across the voltage source V and a conductor 192 which is connected to the collector of transistor 190. When the transistor is biased conductive, the several signal generators are energized. An enabling signal for loading fuel is thus provided, through cable 28, which would be connected to the signal generator appropriate for the rack mounted components of the control system.

The light 36 comprises a light emitting diode 194, which, with a resistor 196, is connected in series between the voltage source V and the collector or transistor 190. Light 36 is thus illuminated to provide a visual indicia that a permit signal as well an enabling signal being generated.

It will be apparent that, if any of the sensors 20 or 22 are wetted when the circuit is energized, there will be at least one low input to the AND gates 50 and 52, to prevent generation of a permit signal and loading of fuel. It will also be obvious that the bottom sensors 22 will be wetted shortly after a loading operation commences.

The function of the bottom sensors is to prevent initiation of a loading operation if there is retained fuel in any of the tank compartments. Once this condition has been verified by high inputs to the AND gate 52, the control function of the system is to prevent an overfill by operation of the top sensors 20. This transfer in functions is accomplished by providing the alternate signal generator 64. This signal generator is actuated by the high output of the bottom detector AND gate 52. The high output of the alternate signal generator 64 is also fed to the AND gate 184. Thus when one of the bottom sensors 22 becomes wetted, and the output of AND gate goes to a low, the "seventh" high input to the AND gate 50 is maintained and loading of fuel continued.

The alternate signal generator 64 comprises a one shot multivibrator 198, which is appropriately connected to the voltage source V. An RC network comprising, resistor 202 and capacitor 200 provides an reset input to the multivibrator 198 when the control circuit is initially energized. This assures that a permit signal will be generated at that time, assuming that all of the sensors 20 and 22 are dry.

The output of the AND gate 52 (conductor 180) is connected, through resistor 204, to the negative going, triggering input for the multivibrator 198. Thus, when the output of AND gate 52 goes from a high to a low, the multivibrator is triggered to provide a high output signal which is fed through diode 206 to the AND gate 184 to thereby maintain a positive, high output from the AND gate 50.

The multivibrator 198 is provided with a time constant input comprising resistors 208, 210, diode 212 and capacitor 214. The time constant provides a cycle period of approximately 30–35 minutes, during which a high input is provided to the AND gate 184. This period of time is sufficient to complete normal loading operations.

As discussed above there are occasions where it is desired to partially fill a compartment with one fuel and then to introduce a second fuel into the same compartment at a different loading rack. Under this circumstance, the bottom sensor for that compartment would be wet and a permit signal couldn't be generated.

As indicated above means are provided for manually actuating the alternate signal generator 64. Such end is attained by resetting the one shot multivibrator 198 in the following manner. The emitter of a transistor 216 is connected to the triggering input of the multivibrator and its emitter is connected to the power source V, the base of the transistor 216 is connected intermediate resistors 218, 220 which are connected across the power source V to ground. The switch 68 is normally open and is interposed between the base of transistor 216 and the resistor 218. Closure and release of the switch 68 biases the transistor 216 so that a negative going signal is provided to trigger the multivibrator 198. A high input signal is thus provided to the AND gate 184 so that a permit signal can be generated to enable loading of fuel in a partially filled compartment.

The foregoing has described normal operation of the control system wherein loading has proceeded without an undesired incident. The system further comprises means for identifying in which compartment there is retained fuel, in which tank a potential overfill condition has been created, and further provides diagnostic functions for isolating which sensor, or the connections thereto, have failed. Such ends are provided by the indicia lights 30, 32 and the circuitry now to be described.

At this point reference will be made to the current detector 74, which comprises a transistor 222. The base and collector of this transistor are connected across the resistor 105. The resistance of this resistor is selected so that the voltage drop (illustratively 0.7 volt) thereacross will be sufficient to bias the transistor to a conductive state in response to quiescent current flow through the sensor 20 (i.e. at least, the current drawn by the oscillator 118, see above discussion).

Thus, at all times there is, or should be, sufficient current flow to bias the transistor 222 to a conductive state, when the sensor is wet and there is no pulsing signal input to the multivibrator 148. Under this condition, a positive signal input is provided to a the base of a transistor 224 which comprises the switch 72. This biases the transistor 224 to a conductive state so that it functions as a normally closed switch.

Also, when the sensor is wet, and the pulse signal is absent, the output signal, on conductor 162 is terminated and there is a low input to the seven way AND gate 50. The multivibrater is further provided with an inverse output, on conductor 226, which, in this state, provides a positive output, which is connected through, resistor 228, to the base of a transistor 230, which comprises the switch 70. The transistor is thus rendered conductive when the sensor 20 is wetted by fuel. The emitters/collecters of the transistors 230 and 224 are connected, from ground, in series, to a light emitting diode 174, which comprises the light 30, and then through a resistor 176 to the power source V.

Therefore, when fuel in the tank reaches a level sufficient to wet the sensor 20, the high input to gate 50 is terminated and the permit signal likewise terminated to halt the loading of fuel. At the same time, the light emitting diode 174 is energized to indicate that a near overfill condition exists in compartment C1, this being the compartment in which the described sensor 20 is mounted.

The pulse detecting circuits for each of the sensors 20, 22 may comprises identical components for illuminating the lights 30, 32 associated therewith. The components for illuminating the light 30, associated with the sensor 20 in compartment C2 is illustrated in FIG. 4. Further description of the circuits for illuminating the lights 32 is not required and has been omitted to avoid repetitiousness.

The point to be recognized is that if a sensor is wetted, a light 30 or 32 will be illuminated to identify in which compartment the wetted condition exists and whether a top of bottom sensor, or both, are wetted. A wetted condition of a bottom sensor is of significance in the initial energization of the circuit in that it identifies the compartment in which there is retained fuel. After the loading operation is initiated, the lights 32 for each compartment being loaded will be illuminated, and the illumination of a light 30 becomes of significance in identifying the compartment in which a near overfill condition exists, and the reason for loss of a permit signal.

Beyond providing for identification of a wetted sensor, the lights 30, 32 also provide self executing means for identifying a failed sensor or a failure in the electrical connections thereto, as previously discussed. The specific means for accomplishing these ends will be described in connection with the sensor 20 for compartment C1, with further reference to FIG. 4.

It is first to be recognized that if there is a sensor failure, or a failure in the connections thereto, there will be a loss of the pulse signal which indicates that the sensor is dry. This means that the output of the multivibrator 148 to the AND gate 50 is a low and the inverse output (at conductor 226) is at a high, biasing the transistor 230 to a conductive state.

If the problem is a faulty top sensor 20, the light 30, for that sensor, will be illuminated. If the light 32, for the same compartment is not illuminated (indicating that it is dry), the top sensor will be pinpointed as defective. Where, upon initial energization, a light 32 is illuminated it indicates either that their is retained fuel in that compartment, or that the associated sensor 22 is defective. If it is determined that there is no retained fuel, then the sensor is identified as being faulty.

Defective wiring connections are identified in a different fashion and are distinguished from a sensor failure by a flashing illumination of the lights 30 and 32. Wiring failures will either be an open circuit or a short circuit in the conductor 106 connecting the sensor 20 to the monitor 26. A separate ground conductor extends between these components and an open circuit in this ground wire could occur and would be identified.

When a open circuit occurs there will be no current flow through the resistor 105. This will result in the loss of a collector bias for the transistor 222 and render is non-conductive.

When a short circuit occurs, there will be a sufficient emitter bias to render the transistor 222 non-conductive. (It will be noted that current flow during the generation of a pulse signal also turns the transistor 222 off. Such action is of no consequence since the transistor is in an off condition when a pulse signal is being generated.)

In either event, when an open or short circuit occurs, the current detector 74 no longer biases the transistor 224 to a conductive state.

This permits the flashing signal generator to control illumination of the light 30. The flashing signal generator may comprise a well known 555 clock circuit, as illustrated in FIG. 4. This circuit comprises a transistor 232 the base of which is periodically driven to a positive bias. This provides a repetitive positive signal for the base of transistor 224 to alternate it between conductive and non-conductive states. Remembering that the transistor 230 is in a conductive state, the light 174 is illuminated in a flashing fashion indicating that there is a wiring connection defect in the electrical connections to the sensor in compartment C1.

It will be noted that is possible for a short, or open to occur in the circuitry components of a sensor. If this were to occur, it would cause a flashing light output on the light 30, giving the impression that the failure mode is in the electrical connections. The integrity of the internal circuitry of the sensors is highly reliable and while possible, it is highly unlikely that such a false indication of the failure mode would occur. Even so, the problem would be identified as existing in a given compartment and related to either a top or bottom sensor.

Again, FIG. 4 illustrates that the same control functions are replicated for identifying an electrical connection failure for the sensor 20 in compartment C2. It will be seen that the flashing signal generator 76 can also provide an input to the transistor 224 of the circuit associated with compartment C2. Thus this component need not be replicated for the several circuits which enable a flashing output of the lights 30 and 32. This is further to say that the same circuit components would be replicated in the circuits for the remaining sensors 20 and 22, all of which could be connected to the single flashing signal generator 76.

A further feature to be noted is that all failure modes are fail safe, in the sense that the permit signal is terminated to prevent an overfill from occurring. There is no urgency in correcting the failure.

There is one further aspect to be addressed. The described circuit is adapted to be used with tanks, representatively, having up to six compartments. This means that when used with a tank having a lesser number of compartments, herein shown as being four compartments, sensors will not be available to provide enabling highs to all of the inputs of the AND gates 50 and 52.

As indicated above this potential problem is avoided by the provision of a dummy signal input to the unused pulse detectors. This end is attained by the aforereferenced dummy signal generator 56, which is shown in greater detail in FIG. 5. The generator 56 may also comprise a 555 clock circuit connected to the base of a transistor 232 to alternate it between conductive and non-conductive states. The conductor 106 is thus periodically connected to ground in the same fashion as when it is connected to a dry sensor. The components of the clock circuit are selected so that the clock frequency is the same as that of the sensor signal (as controlled by oscillator 118). The input to the pulse detector 40 is thus equivalent to the signal produced by a dry sensor and a high input provided to the AND gate 50 to indicate a dry condition for the non-existent compartment C5.

A single dummy signal generator 56 may be employed to provide simulated pulse inputs to all pulse detectors which are not required because there are less than six compartments in the tank on which the system is mounted. This is indicated by the connection between the signal generator 56 and the signal input conductor 106 for the pulse conductor adapted for use with a sixth compartment C6.

It will also be appreciated that the same dummy signal generator 56 can be employed to provide the necessary simulated signals to the pulse detectors 40 which are adapted for use with compartments C5 and C6, when the tank has that number of compartments.

Preferred features are found in mounting the dummy signal generator 56, as are explained by reference to FIG. 6. The cable connection 24 between the monitor 26 and the top sensors 20 is more fully shown, as actually comprises several lengths of cable 24. A first length of cable is connected to the housing of monitor 26 and extends to the sensor 20 for compartment C4. The sensors 20 comprise a housing 234 having threaded openings in which the cables are physically secured and through which the wires of the cable extend for connection with the sensor circuit. A second length of cable 24 then extends from the sensor for compartment C4 to the sensor for compartment C3. This second length of cable is physically secured in a second threaded opening of the housing of sensor 20 for compartment C4 and then secured in a first threaded opening in the housing for sensor 20 in compartment C3. The sensor housings are identical, each comprising two threaded openings to provide the for physically securing the cable connections thereto. Further cable connections are provided between the housings for the sensors 20 in compartments C2 and C1.

It will be apparent that only one cable connection is required to the housing of the sensor 20 for compartment C1, which is at the end of the cable connections. The unused, second threaded opening in this housing provides an advantageous location for mounting of the dummy signal generator 56. The circuit components are mounted in a metal shell 235 which is threaded into this second opening to physically mount it thereon.

Another advantage in mounting the dummy signal generator in this manner is that it is remote from the monitor 26 and relatively difficult to reach. This factors make it less likely that there will be unauthorized tampering with the circuit, which could defeat the safety features thereof.

The cable connections (not shown) between the monitor 26 and the bottom sensors 22 would be made in the same fashion as the cable connections 28. Because it is desirable to physically mount the dummy signal generator on the housing for the terminal sensor in the cable string, it is preferred to provide a second dummy signal generator for the bottom sensor circuits which are not used in an installation having less than six compartments.

These advantages are further illustrated in the wiring diagram shown in FIG. 7.

The described control circuit provides further advantages in that a minimum number of wires are required to provide both sensing and diagnostic functions. The cable 24 may comprise seven wires, i.e., separately insulated conductors, which may be color coded to facilitate proper connection with the sensors 20. The physical connections of the cable sections 24 are not shown in FIG. 7. The top of the each housing 234 is removable to make appropriate connections with the sensor circuits. A common ground wire 236 is connected to and provides a ground connection for each of the sensors circuits. The remaining six wires of the cable are respectively connected to the six pulse detectors 40, for the contemplated application to a six compartment tank. These wires correspond to the conductors 106 referenced in FIG. 4.

More specifically, the green coded wire for compartment C4 is connected to the conductor 106 lead from the sensor 20 mounted in compartment C4. Similarly, the properly color coded cable wires are connected together at the junctures between the cable sections 24 (within the housings 234) and with the appropriate conductor 106 lead of the sensor circuitry. At the terminus of the cable connections, connections are made between the red coded "106" wire and the "106" conductor lead from the circuit for the sensor in compartment C1.

After this connection is made, the ground wire for the dummy signal generator 56 is connected to the ground wire 236 and the "106" conductor lead is connected to the color coded wires representing the "106" wires for the pulse detectors intended for a fifth and sixth compartment.

FIG. 7 also illustrates the wiring connections for the bottom sensors 22. These connections are made in the same fashion as the connections to the top sensors 20 are not deemed to require further description.

The present invention has been described in a preferred embodiment in the trailer mounted portions of a control system for loading multiple compartments in a fuel transport tank. Those in the art will recognizes that the broader aspects of the invention are not limited to this environment. This is to say that there are aspects of the invention which will find use in loading stationary tanks and that the tanks being loaded may be comprise a single compartment, as well as multiple compartments. Further it will be apparent that the inventive concepts of the invention, while advantageously employed in the loading of fuels and other petroleum products, will find application in the loading of other liquids.

The scope of this invention is therefore to be derived from and to be limited by the following claims, within which the spirit of the present inventive concepts falls.

Having thus described the invention, what is claimed as novel and desired to be secured by Letters Patent of the United States is:

1. A system for controlling the loading of liquid into a tank,
   said system being adapted to assure that liquid will not be loaded under conditions which would result in the tank being overfilled,
   said system comprising
   A. independently controlled means for loading liquid into the tank,
      a. said independently controlled loading means requiring an enabling signal input in order to initiate and to continue loading of liquid into the tank,
   B. means for generating said enabling signal input, said generating means comprising
      a. a sensor
         i. mounted in the tank,
         ii. comprising means for generating a "dry" signal so long as the level of liquid in the tank is below said sensor,
         iii. having a fail safe failure mode wherein the generation of a "dry" signal is terminated in the event of a malfunction in the means for generating the "dry" signal,
      b. an enabling signal generator operative to generate the enabling signal in response to and only so long as there is a "dry" signal input from said sensor,
      c. electrical conduit means interconnecting said sensor and its means for generating a "dry" signal with said enabling signal generator, to provide the "dry" signal input therefor, so that the loading of liquid cannot be initiated, or continued, in the event that the level of liquid in the tank reaches the sensor, C. sensory discernable means having a first condition indicating that a "dry" signal is not being generated and a second condition for indicating that a "dry" signal is being generated, whereby, if there is a failure to generate an enabling signal and the sensory discernable means have the one condition, a visual examination of the liquid level will confirm that there has been a failure in the "dry" signal generating means of the sensor, if the liquid level is below the sensor, characterized in that D. the sensory discernable means have a third condition that indicates a failure in the electrical conduit means interconnecting the sensor and the enabling signal generator, whereby trouble shooting is further facilitated by the ability to identify that the failure of an enabling signal is attributable to a failure in the electrical conduit connection between the sensor and the enabling signal generator.

2. A system for controlling the loading of liquid into a tank, as in claim 1, further characterized in that the discernable means comprise illuminatable means.

3. A system for controlling the loading of liquid into a tank, as in claim 2, further characterized in that one of the three conditions of the illuminatable means is a lack of illumination, another of the three conditions is the emission of a steady state light, and yet another of the three conditions is the emission of a flashing light.

4. A system for controlling the loading of liquid into a tank, as in claim 2, further characterized in that the first condition of the sensory discernable means, indicating that a "dry" signal is not being generated, is the emission of a steady state light, the second condition of the sensory discernable means, indicating that a "dry" signal is being generated is a lack of illumination, and the third condition of the sensory discernable means, indicating that a failure exists in the electrical conduit means interconnecting the sensor and the enabling signal generator, is the emission of a flashing light.

5. A system for controlling the loading of liquid into a tank, as in claim 1, wherein the sensor means for generating a "dry" signal include means for generating a "dry" signal in the form of a pulsing current flow through said electrical conduit means, and said means for generating a "dry" signal has a quiescent current flow, of a given magnitude, at all times, irrespective of whether a "dry" signal is being generated, means responsive to a deviation of said quiescent current flow from said given magnitude, for causing the sensory means to be in its third condition.

6. A system for controlling the loading of liquid into a tank, as in claim 5, further characterized in that the discernable means comprise a light emitting device, which is illuminated when connected across an electrical power source, and the enabling signal generating means comprises a signal detector responsive to the generation of a "dry" signal for providing a detection signal, so long as there is no interruption in said "dry" signal, switching means in series with said light emitting device for controlling flow of current thereto, said switching means being responsive to a detection signal to disconnect the light emitting device from a power source to that the light emitting device is unlit so long as a "dry" signal is being generated, said switching means being responsive to termination of a detection signal to connect the light emitting device across a power source to that the light emitting device is lit when a "dry" signal dry signal is not being generated, and the means responsive to a deviation of said quiescent current flow from said given magnitude, for causing the sensory means to be in its third condition, includes means for causing said light emitting device to be intermittently connected across a power source, thereby producing a flashing light to indicate a failure in the electrical conduit means.

7. A system for controlling the loading of liquid into a tank, as in claim 6, further characterized in that the switching means comprise a pair of transistors having their collectors and emitters connected in series with the light emitting device, one of said transmitters being biased to a conductive stage in the absence of a "dry" signal being generated, the other of said transistors being biased to a conductive state when quiescent flow exists at said given level, whereby both transistors are conductive in the absence of a "dry" signal being generated and the light emitting device has a steady state illumination indicated either that the sensor is wetted or that there is a failure in the "dry" signal generating means, and further that there has not been a failure in the electric conduit means.

8. A system for controlling the loading of liquid into a tank, as in claim 7, further characterized in that a clock device periodically drives the second transistor between conductive and non-conductive state in response to said quiescent flow deviating from said given level, whereby the light emitting device is periodically connected across the voltage source and has a flashing illumination, indicating that there has been a failure in the electrical conduit means.

9. A system for controlling the loading of liquid into a tank comprising a plurality of compartments, said system being adapted to assure that liquid will not be loaded under conditions which would result in any compartment of the tank being overfilled, said system comprising A. independently controlled means for loading liquid into the compartments of the tank, a. said independently controlled loading means requiring an enabling signal input in order to initiate and to continue loading of liquid into the compartments of the tank, B. means for generating said enabling signal input, said generating means comprising a. a sensor mounted in each compartment of the tank, each sensor i. comprising means for generating a "dry" signal so long as the level of liquid in a tank compartment is below the sensor mounted therein, ii. having a fail safe failure mode wherein the generation of a "dry" signal is terminated in the event of a malfunction in the means for generating the "dry" signal, b. an enabling signal generator operative to generate the enabling signal in response to and only so long as there is a "dry" signal input from all of said sensors, c. electrical conduit means interconnecting each of said sensors and its means for generating a "dry" signal with said enabling signal generator, to provide the "dry" signal input therefor, so that the loading of liquid cannot be initiated, or continued, in the event that the level of liquid in the tank reaches the sensor, C. sensory discernable means associated with each compartment, each sensory discernable means having one condition indicating that a "dry" signal is not being generated and a second condition for indicating that a "dry" signal is being generated by the sensor in the compartment with which the sensory discernable means is associated, whereby, if there is a failure to generate an enabling signal, the sensory discernable means will indicate the compartment in which there is a failure to generate a "dry" signal and a visual examination of the liquid level in that compartment will confirm that there has been a failure in the "dry" signal generating means of the sensor, if the liquid level is below the sensor, characterized in that D. each sensory discernable means have a third condition that indicates a failure in the electrical conduit means interconnecting the sensor and the enabling signal generator, whereby trouble shooting is further facilitated by the ability to identify that the failure of an enabling signal is attributable to a failure in the electrical conduit connection between the sensor in a given compartment and the enabling signal generator.

10. A system for controlling the loading of liquid into a tank comprising a plurality of compartments, as in claim 9, further providing means for preventing the loading of fuel into a tank compartment having retained liquid, wherein said sensors are disposed, in each compartment, adjacent the upper portion thereof and are known as top sensors, and the sensory discernable means associated with each compartment are top sensory discernable means indicating that a "dry" signal is or is not being generated or whether there is a failure in the respective conduit means for the top sensor in that compartment, further characterized in that the means (B) for generating said enabling signal input further includes d. a bottom sensor mounted in each compartment of the tank, each bottom sensor i. comprising means for generating a "dry" signal so long as the level of liquid in the tank compartment is below the sensor mounted therein, ii. having a fail safe failure mode wherein the generation of a "dry" signal is terminated in the event of a malfunction in the means for generating the "dry" signal, e. means, operative in response to a "dry" signal being generated by all of the bottom sensors for generating a signal indicating the initial absence of liquid from all compartments, f. electrical conduit means interconnecting each of said bottom sensors and its means for generating a "dry" signal with said enabling signal generator, to provide the "dry" signal input therefor, so that the loading of liquid cannot be initiated in the event that there is retained liquid in the tank when a loading operation is started, and the enabling signal generator is operative to initiate generation of the enabling signal in response to a "dry" signal input from all of the top and bottom sensors and further operative to maintain generation of the enabling signal only so long as "dry" signals are being generated by all of the top sensors, E. bottom, sensory discernable means associated with each compartment, each bottom, sensory discernable means having one condition indicating that a "dry" signal is not being generated and a second condition for indicating that a "dry" signal is being generated by the bottom sensor in the compartment with which the sensory discernable means is associated, whereby, if there is a failure to generate an enabling signal, the bottom sensory discernable means will indicate the compartment in which there is a failure to generate a "dry" signal because of retained fuel in that compartment or, upon a visual examination of the liquid level in that compartment, will confirm that there has been a failure in the "dry" signal generating means of the sensor, if the liquid level is below the sensor, further characterized in that F. each bottom, sensory discernable means have a third condition that indicates a failure in the electrical conduit means interconnecting that bottom sensor and the enabling signal generator, whereby trouble shooting is further facilitated by the ability to identify that the failure of an enabling signal is attributable to a failure in the electrical conduit connection between the bottom sensor in a given compartment and the enabling signal generator.

11. A system for controlling the loading of liquid into a tank, as in claim 10, further characterized in that the top discernable means and the bottom sensory discernable means, each comprise a light emitting device, one of the three conditions of each light emitting device is a lack of illumination, another of the three conditions is the emission of a steady state light, and yet another of the three conditions is the emission of a flashing light.

* * * * *